United States Patent [19]

Shigeta et al.

[11] 4,081,211
[45] Mar. 28, 1978

[54] PROCESSING CONDITION CONTROL SYSTEM FOR A MULTI-PURPOSE FILM HANDLING CARTRIDGE

[75] Inventors: Yoshihiro Shigeta, Tokyo; Kiyoshi Takahashi, Kunitachi, both of Japan

[73] Assignee: Canon Kabushiki Kaisha, Tokyo, Japan

[21] Appl. No.: 608,650

[22] Filed: Aug. 25, 1975

Related U.S. Application Data

[63] Continuation of Ser. No. 472,442, May 22, 1974, abandoned.

[30] Foreign Application Priority Data

May 25, 1973 Japan .................................. 48-58925
May 25, 1973 Japan .................................. 48-58926
May 25, 1973 Japan .................................. 48-58927
May 25, 1973 Japan .................................. 48-58928

[51] Int. Cl.² ............................................. G03C 11/00
[52] U.S. Cl. ................................. 352/130; 352/172; 352/180; 352/182; 354/84; 354/299
[58] Field of Search ................... 354/304, 299, 84, 86; 352/130, 172, 180, 182, 14

[56] References Cited

U.S. PATENT DOCUMENTS

| 2,326,654 | 8/1943 | Jagust | 352/172 |
| 2,768,564 | 10/1956 | Land | 354/299 |
| 2,987,956 | 6/1961 | Planert | 352/172 |
| 3,335,695 | 8/1967 | Hayashi | 352/172 |
| 3,554,107 | 1/1971 | McCarthy | 354/299 |
| 3,601,479 | 8/1971 | Komine | 352/172 |
| 3,604,329 | 9/1971 | Land | 354/299 |
| 3,792,919 | 2/1974 | Holmes | 352/130 |
| 3,800,306 | 3/1974 | Land | 352/130 |

FOREIGN PATENT DOCUMENTS 14,024 of 1908 United Kingdom ................. 354/299

Primary Examiner—Monroe H. Hayes
Attorney, Agent, or Firm—Toren, McGeady and Stanger

[57] ABSTRACT

A system for controlling development conditions under which an exposed film strip is processed with a compact multi-purpose film handling cartridge. The film cartridge which is adapted to be mounted in a motion picture camera and projector employing the system of the invention and including motor drive means contains a strip of film, a processing station, film advance means engaging said drive means when the cartridge is mounted in said camera or projector, and an applicator containing development chemicals positioned in said processing station to be brought into operable relationship with the film strip when said processing station is rendered operable, thereby they are expressed onto the film strip from the applicator while said film strip is being advanced. In order to optimize the processing of the exposed film strip regardless of deviation of the temperature of the development chemicals from a desired predetermined level, the system includes means located in close proximity to the applicator for detecting the ambient temperature thereof, a first motor control means cooperating with said temperature detecting means to control the speed of said motor in accordance with the detected temperature, and a second motor control means for maintaining a constant rate of travel of the film strip advanced by said film advance means across the processing station, said first and second motor control means being associated with each other for processing the exposed film strip in optimization as well as in uniformity along the length of the film strip.

6 Claims, 10 Drawing Figures

PROCESSING CONDITION CONTROL SYSTEM FOR A MULTI-PURPOSE FILM HANDLING CARTRIDGE

This is a continuation of application Ser. No. 472,442 filed May 22, 1974, now abandoned.

BACKGROUND OF THE INVENTION

1. Field of Invention

This invention relates to processing systems utilizing motion picture film handling cartridges, and more particularly to a system for controlling development processing conditions under which a thin coating of processing fluid is applied to an exposed strip of motion picture film while it is being advanced through a processing station within a cartridge. Still more particularly, the invention relates to improvements in the construction of devices for controlling the rate of travel of the film strip across the processing station in accordance with the processing temperature to effect an optimum processing of the film strip with uniformity along the length of the film strip.

2. Description of Prior Art

The field of amateur motion picture photography has developed rapid processing and projection systems utilizing compact multi-purpose film handling cartridges. The film handling cartridge is adapted to be mounted first in a motion picture camera for exposure purposes and then in a motion picture projector for projection purposes. After a strip of film contained in the cartridge has been exposed, the film strip is processed with the cartridge remaining unremoved from the same camera employing a rapid processing system, or mounted in a specially designed processor, or in a processor-projector unit which is constructed to facilitate processing and subsequent projection operations. In these systems, the processing fluid is stored in an applicator within the cartridge from which it is expressed onto the exposed film strip when the processing station is rendered operable. Examplary of such system are those described in U.S. Pat. Nos. 3,641,896; 3,641,909 and 3,687,051.

In applying a thin coating of processing fluid to an exposed strip of motion picture film contained in the cartridge, it is of importance to maintain the temperature of the processing fluid within an optimum processing temperature range during the processing operation, or otherwise satisfactory processing results cannot be effected, particularly when the exposed film is processed not in a processing laboratory, but by the rapid processing system employed in a motion picture camera or projector which is subject to ambient temperature variation. The generally accepted development processing temperature is in a range from about 10° to about 35° C. At the processing laboratory, the processing temperature control can be readily effected with sufficient accuracy by provision of a temperature control device in the processing unit. However, the presently proposed processor-camera units and processor-projector units lack any temperature control device, so that the temperature of the processing fluid is permitted to frequently deviate from the optimum range with variation of the ambient temperature of the unit, and, in the case of the processor-projector unit, by the generation of heat in the illumination system for image projection. It is to be noted that the development process is influenced by the processing time and temperature, these two processing condition control factors being intimately related to each other for effecting an equivalent development result. As the processing temperature increases, the processing time should be decreased to effect equivalent development results. Whilst the technique for controlling the processing time by maintaining a constant rate of travel of an exposed strip of film across the processing station is disclosed, as for example, in U.S. Pat. Nos. 3,616,740 and 3,623,417, no rapid processing system taking into acount the temperature effect on the development process have so far been available.

SUMMARY OF THE INVENTION

It is therefore the general object of the present invention to provide a processing system utilizing a multipurpose motion picture film handling cartridge of the type described and in which the processing time is controlled in accordance with the temperature of processing fluid or the ambient temperature of the cartridge.

An object of the present invention is to provide a processing system utilizing a film handling cartridge of the type described in which the rate of travel of the film strip across a processing station within the cartridge is controlled in accordance with the ambient temperature of the cartridge to effect an optimum processing of the film strip regardless of deviation of the processing temperature from an optimum range.

Another object of the present invention is to provide a processing system utilizing a film handling cartridge of the type described and employing a temperature control device positioned adjacent the processing station within the cartridge and externally mounted thereof upon deviation of the processing temperature from the optimum range to bring the processing temperature back into a desired predetermined processing temperature range.

Still another object of the present invention is to provide a processing system utilizing a film handling cartridge of the type described, said cartridge containing reel means for transporting the film strip past a processing station within the cartridge, and which system includes drive means including a motor and is constructed to control the processing time and temperature by employment of means for detecting the processing temperature in combination means for detecting ever varying radii of the film strip coil around one reel as development control factor detecting means necessary for effecting an optimum processing of the exposed film strip, said temperature detecting means and said radius detecting means constituting part of the motor control means associated with the camera's or projector's drive means, thereby a substantially constant amount of processing fluid expelled onto the film strip per unit time and unit area is maintained at any particular instance as the film strip is being transported through the processing station from one reel means to another.

A further object of the present invention is to provide a processing system utilizing a film handling cartridge of the type described, said cartridge containing reel means for transporting the film strip past a processing station within the cartridge, and which system includes drive means including a motor, a first motor control means for maintaining a constant rate of travel of the film strip across the processing station and a second motor control means for controlling the speed of said motor in accordance with the processing temperature, said first and second motor control means being associated with each other to effect an optimum processing of the exposed film strip with uniformity along the length of the film strip regardless of deviation of the processing temperature.

An additional object of the invention is to provide a film handling cartridge of the type described and provided with a temperature indicating means mounted in a recessed portion formed on the housing of the cartridge and located in close proximity to the processing fluid storing means to indicate for the operator how much degree is the temperature of the processing fluid, thereby the processing system into which said cartridge is about to be loaded can be set to a processing operation condition by the operator according to the indication of the temperature indicating means.

Also an object of the invention is to provide a processing system utilizing a film handling cartridge of the type described, said cartridge having a film gate for exposure and containing reel means for transporting the film strip past the processing station within the cartridge, said reel means engaging the drive means external of the cartridge when the cartridge is mounted in the system, which system can be employed in a motion picture camera adapted to receive the cartridge, facilitate selective reversible transport of the film strip past the film gate from one reel to another between the exposure and processing stages, and control the rate of travel of the film strip across the processing station in accordance with the processing temperature when the processing station is rendered operable.

According to a preferred embodiment of the present invention, the processing system comprises a cartridge adapted to be removably mounted therein, said cartridge containing a strip of film, a processing station and means for advancing the film strip across the processing station, drive means including a motor externally mounted of the cartridge and arranged to be engageable with said film advance means when the cartridge is inserted into the system means for detecting the processing temperature and motor control means responsive to said temperature detecting means for changing the speed of said motor in such a manner that when the detected processing temperature is higher than a predetermined level within the optimum processing temperature range, the rate of travel of the film strip advanced by said film advance means across the processing station is increased, or vice versa. By the term "a predetermined level in an optimum processing temperature range" herein used is meant that a reference temperature, for example, usually 20° C is previously determined for definition of higher and lower temperatures.

According to another preferred embodiment of the present invention, the processing system with a film handling cartridge of the type described mounted in a motion picture camera or projector which can be utilized to facilitate processing operations as well as exposing or projection operations is provided with means for detecting the temperature of processing fluid or the ambient temperature of the processing station, and air conditioning means associated with said temperature detecting means upon deviation of the detected processing temperature from the predetermined level in the optimum processing temperature range to be rendered operative to control the temperature of the processing fluid or processing station by heating or cooling.

In addition to the problem of achieving optimization of development process by taking into account the temperature effect, another problem is to apply a uniform coating of the processing fluid on the film strip over the entire length thereof. So long as the expelling rate of the processing fluid from the applicator onto the film strip is maintained constant, it is necessary to maintain a constant rate of travel of the film strip advanced by a film advancing mechanism as the film passes in front of the applicator. Various film advancing mechanisms are available which employ sprocket, claw, capstan, pinch roller and the like. From the point of view of a relatively fast rate of film transportation speed during the processing operation as compared with those associated with exposure or projection operations, it is preferred to employ a film advancing mechanism of driven reel type. In this case, the drive means including a motor has to be provided with means for changing the speed of the motor so as to held substantially constant the rate of travel of the film strip across the applicator during the entire operation of the applicator even though the film strip is being coiled in turns of ever increasing diameters on the driven reel.

Accordingly, the processing system of the invention employing a film advancing mechanism of the driven reel type and utilizing a film handling cartridge of the type described and having coplanar reels is preferably provided with a second motor control means for controlling the speed of the motor as a function of the amount of the film strip coiled on the either of the reels to maintain a constant rate of travel of the film strip across the applicator during the entire operation of the applicator.

With the film handling cartridge of the type described, it is desirable for more reliable processing operations that the operator knows whether the temperature of processing fluid is in the optimum processing temperature range, e.g., from 10° to 35° C, before the processing operation is initiated.

According to still another preferred embodiment of the present invention, the provision for indicating for the operator whether the temperature of the processing fluid in the cartridge is in the optimum processing temperature range is made on the housing of the cartridge.

Other objects and features of the present invention will become apparant from the following detailed description taken in conjunction with the accompanying drawings wherein like numbers have been employed in the different figures to denote the same parts.

DESCRIPTION OF THE PREFERRED EMBODIMENT

Figure 1:
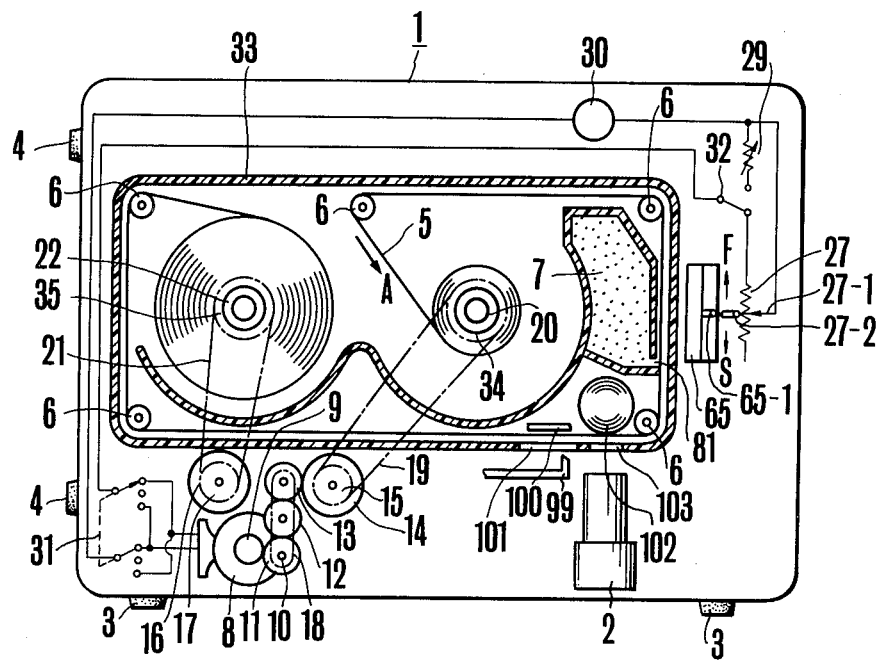
FIG. 1 is a schematic side elevational view, partially in section, of a motion picture film handling cartridge mounted in a projector employing a processing system according to one form of one embodiment of the present invention, said projector with its front panel removed being disposed in an operative position for processing operations in which the projector is forwardly inclined through 90° from the projection position.

Referring to FIG. 1, a processing system according to one form of embodiment of the present invention is employed in a projector that is generally indicated at 1 and illustrated as including a projection lens system 2 and a motion picture film handling cartridge 33 removably mounted therein and having coplanar reels 20 and 22 to which respective ends of a strip of motion picture film are permanently attached. The cartridge 33 contains a processing station including an applicator 7 having an orifice 81 and containing development chemicals, and it is adapted to be mounted first in a motion picture camera and then in the projector to facilitate film exposing, processing and projection operations. The housing of the projector 1 is provided with a number of feet 3 on which the projector 1 stands during the processing stage and a number of feet 4 on which the projector stands during the projection stage, so that the projector 1 may be disposed in either of the two operative positions different from each other through 90° in a plane as viewed in FIG. 1 between the processing and projection stages. The entire length of the film strip 4 is initially coiled around a supply reel 20 before exposure thereof. During exposure operations, the film strip passes through an exposure aperture 103 from the supply reel 20 to the take up reel 22, travelling a number of idlers 6. After the film strip has been exposed, the cartridge is removed from the camera and then inserted into the projector 1, thereby the reels 20 and 22 are brought into engagement with the projector's drive means to facilitate selective reversible transport of the exposed film strip from one reel to another. The drive means comprises a motor 8, a friction gear 9 fixedly mounted on the shaft of the motor 8, a train of friction gears 11, 12, 13 rotatably mounted on an arm 18 extending from a pin 10 which serves a shaft about which the friction gear 11 is rotated. In response to energization of the motor 8, by throwing a transfer switch 31, the friction gear 13 is caused to engage either of the friction gears 14 and 16 depending upon the direction of rotation of the motor 8. A pulley 15 coaxially mounted on the friction gear 14 is connected by a belt 19 to a pulley 34 fixedly mounted on the shaft adapted to be brought into engagement with the reel 20 when the cartridge is inserted to the projector, while a pulley 17 coaxially mounted on the friction gear 16 is connected by a belt 21 to a pulley 35 fixedly mounted on a shaft for engagement with the reel 22. The drive motor 8 is connected to a power source 30 through the transfer switch 31 having three operative positions for forward and reversed rotations and an inoperative of the motor 8, another transfer switch 32 for setting the projector to either of the processing and projection operation conditions, and a variable resistor 29 for controlling the speed of the motor 8 when the switch 32 is set to the projection operation condition, said variable resistor 29 and said two transfer switches 31 and 32 being connected in series with each other and with the motor 8.

In order to control the speed of the motor 8 in accordance with the ambient temperature of the processing station, the projection's drive means including the motor 8 is provided with motor control means constructed in the form of a variable resistor 27 connected in series with the motor 8 in combination with temperature detecting means constructed in the form of a thermometer 65 provided with a movable temperature indicator 65-1. The thermometer 65 is located in close praximity to the applicator 7 externally of the cartridge and arranged adjacent the variable resistor 27 so that the pointer 27-2 mounted on the slider 27-1 of the resistor 27 can be manually positioned in alignment with the displaced temperature indicator 65-1. The cartridge 33 is further provided with a pressure plate 100 mounted within the housing of the cartridge 33, an aperture opening adapted to receive a pulldown claw 99 cooperating with the perforation holes of the film strip to intermittently advance the film strip across a film gate 103 when the projection station is rendered operative, a light-reflecting element associated with a lens 102 to introduce light rays coming from an illumination light souce not shown mounted in front of the lens 102 as viewed in FIG. 1 into the cartridge. The light rays entering the lens 102 is reflected from the light-reflecting element by an angle of 90° to the film passing behind the film gate 103, thereby the image formed on the developed film is projected to a screen not shown positioned in a distance from the projector.

In applying the processing fluid onto the exposed film strip as it is being transported across the applicator from the take-up reel to the supply reel, gravity may be utilized as a force which causes the processing fluid to be expelled from the orifice thereof. In this case, therefore, it is preferred to set the projector 1 to the operative position where the applicator 7 is disposed with its orifice being in the downmost position as indicated in FIG. 1 during the processing operations. After the processing operation has been completed, the projector 1 is permitted to stand on the feet 4 so that the orifice of the applicator is directed upward to prevent the remaining processing fluid in the applicator from being expelled therefrom to adhere to the film as it is being transported in front of the orifice during the projection operations. Such a selective setting of the projector between the two operative positions is usually made as far as the preferred embodiments of the invention utilizing the cartridge of the type illustrated in the drawings are concerned. However, it is of course, possible to perform the projection operation subsequent to the processing operation with the projector set in the same operative position.

The operation of the processor-projector unit shown in FIG. 1 is as follows. When the cartridge of the type described is inserted in the cartridge chamber within the projector 1, the projector's drive means is brought into engagement with the reels 20 and 22 of the cartridge to facilitate selectively reversible transport of the film strip for sequence of processing and projection operations.

The orifice of the applicator is initially sealed by any suitable means adapted upon initiation of the processing operation to be removed therefrom to permit the processing fluid to be expelled through its orifice onto the film strip under the force of gravity. Setting the transfer switch 31 to its "process" position renders operable the processing station including the applicator 7, thereupon the motor 8 is rotated in a counter-clockwise direction as viewed in FIG. 1 to cause the arm 18 to turn in a clockwise direction, so that the supply reel 20 is connected to the motor 8 through a friction gearing arrangement 9, 11, 12, 13, 14, 15, 19 and 34, and rotated in a counter-clockwise direction to draw the film strip across the applicator 7 in the direction indicated by arrow A. So long as the transfer switch 32 is set to its "process" position indicate by the solid lines in FIG. 1, the variable resistor 27 for controlling the speed of the motor in accordance with the processing temperature is incorporated in the motor drive circuit. The thermometer 65 with the temperature indicator 65-1 positioned adjacent the variable resistor 27 is so designed that as the ambient temperature of the applicator decreases, the indicator 65-1 is permitted to move from an end designated by F to the opposite end thereto designated by S. As the slider 27-1 of the variable resistor 27 is moved manually in alignment of the indicator 65-1 with the pointer 27-2 in a direction from F to S, the resistance of the variable resistor 27 is increased with decrease in the corresponding speed of the motor 8. The alignment of the pointer 27-2 with the temperature indicator 65-1 can be effected automatically in the embodiment to be subsequently described in connection with FIGS. 2, 4 and 6.

Figure 2:
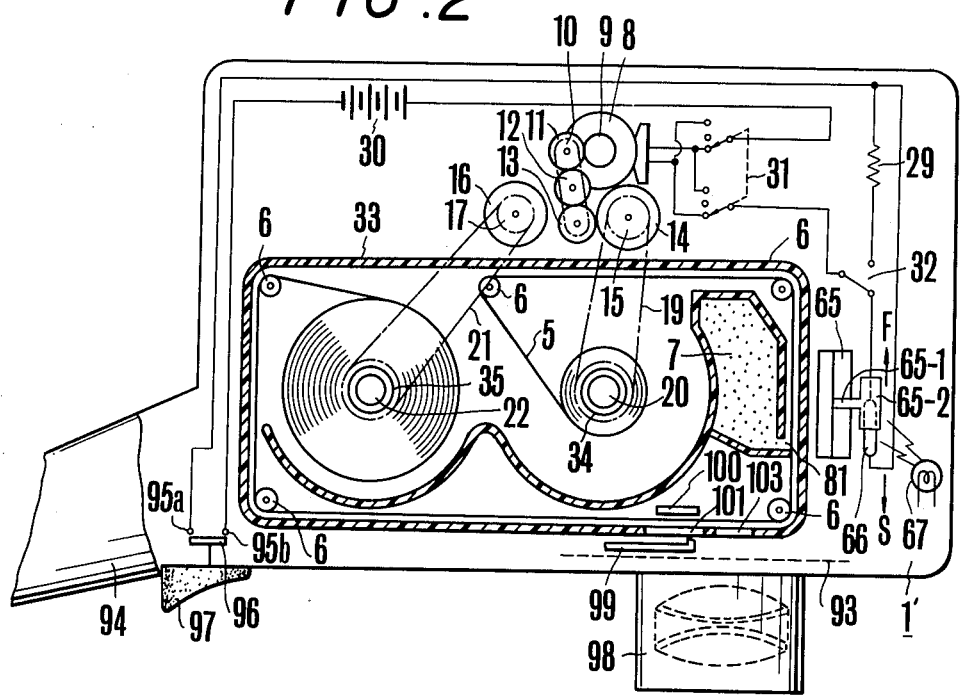
FIG. 2 is a schematic side elevational view, partially in section of a motion picture film handling cartridge mounted in a camera employing a processing system according to another form of the embodiment shown in FIG. 1, said camera with its front panel removed being disposed in an operative position for processing operations, where the camera is forwardly inclined through 90° from the picture taking position.

In FIG. 2, there is shown a motion picture film handling cartridge mounted in a motion picture camera employing the processing condition control system of the present invention shown in FIG. 1 with an automatic alignment device between the temperature detecting means and the motor control means. The motion picture camera that is generally indicated at 1' includes an objective lens system in a lens mount 98, a grip 94 and a shutter release button 97. Upon depression of the shutter release button 97, switch means comprising a pair of fixed contacts 95a and 95b and a movable contact 96 is closed to complete a shutter drive circuit. The thermometer 65 is provided with a light-shielding means 65-2 mounted on the temperature indicator 65-1 thereof. The light-shielding means 65-2 is arranged around a photoconductive element 66 such as a CdS element, so that a movement of the light-shielding means 65-2 along the length of the photoconductive element 66 results in a variation of the amount of energy of light rays coming from an energized lamp 67 and impinging on the assembly of the light-shielding means 65-2 and the photoconductive element 66, thereby the resistance of the photoconductive element connected in series with the motor 8 is varied with processing temperature.

The cartridge 33 which is initially furnished with the entire length of the film strip in an unexposed condition coiled on the supply reel 20 is inserted in the motion picture camera 1' for exposure purposes. Setting the transfer switch 31 to its "exposure" position for the forward rotation of the motor 8 and then the other switch 32 to its "exposure" position different from that indicated by the solid line renders operable the exposure station of the camera 1'. The depression of the shutter release button 97 actuates the claw mechanism 99 to advance the film strip across the film gate 103 behind the objective 98 from the supply reel 20 to the take-up reel 22. After the film strip has been exposed, the entire length of the film strip is coiled in an exposed condition on the take-up reel 22 as shown in FIG. 2. By now setting the switches 31 and 32 from their "exposure" positions to their "processing" positions and depressing the shutter release button 97 to bring the movable contact 96 into contact with the fixed contacts 95a and 95b, the exposed film strip is returned from the take-up reel 22 to the supply reel 20. During this sequence, the exposed film strip 5 passes across the orifice 81 in sliding engagement therewith and draws processing fluid from the applicator 7 to form a fluid coating on the film strip. In order to effect an optimum processing of the film strip regardless of deviation of the processing temperature from the optimum range, there is provided with a motor control device including a thermometer 65, a photoconductive element 66 and a light source 67. The device is designed so that as the processing temperature increases, a larger portion of the photoconductive element body is exposed to light rays from the light source 67, thereby the resistance of the photoconductive element connected in series with the motor 8 is decreased with increase in the corresponding speed of the motor 8. In order to form a uniform fluid coating on the film strip along its entire length, it is required to maintain substantially constant the rate of travel of the film strip across the processing station during the entire operation of the applicator ever though the film is being coiled in turns of increasing diameters on the supply reel 20 provided that the processing temperature is maintained constant. In addition to the first motor control device of the type described above, therefore, the preferred embodiments of the invention illustrated in FIGS. 3 and 4 employ second motor control devices.

Figures 3A, 3B:
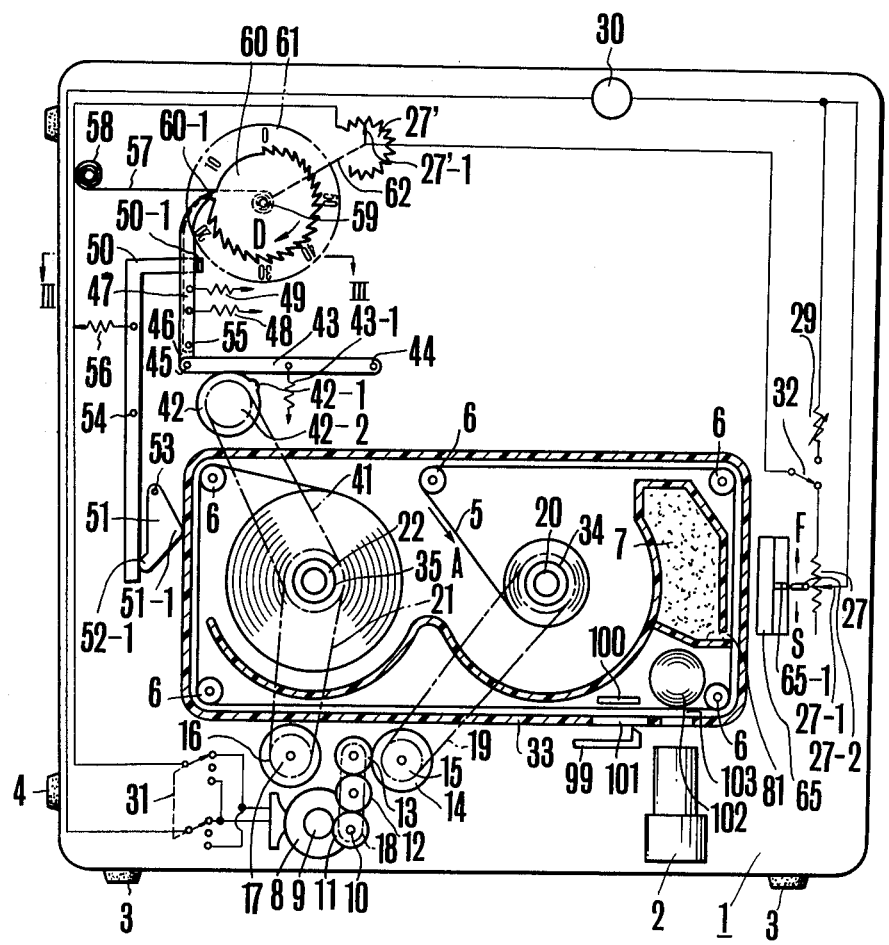
FIG. 3A is a schematic side elevational view, partially in section, of a processing system according to one form of another embodiment of the present invention.
FIG. 3B is a fragmentary sectional view taken along line III—III of FIG. 3A.

In FIGS. 3A and 3B, a second motor control device is illustrated as comprising a cam mechanism, a ratchet mechanism and a variable resistor 27'. The cam mechanism comprises a cam disk 42 having a projection or lobe 42-1 formed on its peripheral camming surface, a pulley 42-2 fixedly coaxially mounted on the cam disk 24 and operatively connected by a belt 41 to the projector's drive means, and a lever 43 which is fulcrumed at a pin 44 mounted on the housing of the projector 1 and which is biased by an over-the-center spring 43-1 to cause the abutting engagement with the camming surface. The ratchet mechanism comprises a ratchet 46 which is mounted on a pivot pin 45 provided on the free end of the reciplocating lever 43 and which biased in the clockwise direction by a spring 48, a pawl 47 which is mounted on a pivot pin 55 fixedly mounted on the ratchet 46 at a point adjacent to the pin 45 and which is biased by a spring 49 in a clockwise direction, and a ratchet wheel 60 associated with the variable resistor 27' upon rotation of the wheel 60 to vary the resistance of the resistor 27'. The ratchet mechanism is provided with an actuating mechanism which renders operable the ratchet mechanism in response to the insertion of the cartridge into the projector's chamber. The actuating mechanism comprises a lever 50 which is fulcrumed at a pin 54 and which is biased by a spring 56 in the counter-clockwise direction, said lever 50 having an extension 50-1 as shown in FIG. 3B which is caused to disengage from the ratchet 46 and pawl 47 when the cartridge is mounted in the projector, and a rectangular plate 51 pivotably mounted on a pin 53, said plate 51 having a projection 51-1 extending into the cartridge chamber upon insertion of the cartridge into the chamber to engage a portion of the cartridge housing and having another projection 51-2 engaging the opposite end of the lever 50 to the extension 50-1. A turning movement of the plate 51 about the pivot pin 53 caused by the insertion of the cartridge results in a turning movement of the lever 50 about the pin 54 against the force of the spring 56 in a clockwise direction so that the ratchet 46 and pawl 47 are permitted to engage the ratchet wheel 60. The wheel 60 is provided with a footage indicator 61 mounted on a common shaft 62. When the cartridge is removed from the chamber, the lever 50 is turned in a counter-clockwise direction under attraction force of the spring 56 to cause the ratchet 46 and pawl 47 to disengage from the wheel 60, thereupon the wheel is rotated in the counter-clockwise direction by the force of a coil spring 57 until a relatively large tooth 60-1 is brought into engagement with the pawl 47 at which time the footage indicator 61 is zeroed. At the same time the variable resistor 27' is set at a minimum resistance position.

In operation of the second motor control device shown in FIGS. 3A and 3B, when the cartridge is mounted in the projector 1, the ratchet 46 and pawl 47 are brought into engagement with the ratchet wheel 60 by the operation of the actuating mechanism. Throwing the switch 31 from its "off" position to its "processing" position indicated by the solid line in FIG. 3A, energizes the motor 8, clutches the motor 8 to the belt 19 through the friction gearing arrangement 9, 11, 12, 13, 15 and 34 and initiates the rotation of the supply reel 20. As the supply reel 20 is driven into rotation, the exposed film strip is transported from the take-up reel 22 to the supply reel 20 across the processing station, thereby the rotation of the take-up reel 22 is transmitted through the belt 41 to the cam disk 42. As the cam disk 42 is rotated, the lever 43 abuttingly engageing the cam disk 42 is forced to reciprocating about the pivot pin 44, and the reciprocating motion of the lever 43 is conveyed by the ratchet 46 cooperating with the pawl 47 to the ratchet wheel 60, thereby the ratchet wheel 60 is rotated tooth by tooth. In this arrangement, the reduction gear ratio is such that when the entire length of the film strip has been coiled on the supply reel 20, the footage indicator takes a full scale position, in this instance, a position indicated by a numeral character 50. The variable resistor 27' associated with the ratchet wheel 60 is arranged in the motor control device so that as the film is being coiled in turns of increasing diameters on the supply reel 20, the resistance of the resistor 27' is increased with decrease in the corresponding speed of the motor 8 so as to maintain a constant rate of travel of the film strip across the processing station during the entire operation of the applicator. The variable resistor 27' is connected in series with the motor 8 as well as with the variable resistor 27 of the first motor control device to effect an optimum processing of the film strip with application of a uniform fluid coating along the length of the film strip regardless of deviation of the processing temperature from the optimum range.

In addition to the advantage of applying a uniform fluid coating on the film strip, the second motor control device has an additional advantage of teaching the operator how great a portion of the entire length of the film strip has been processed, or remains unprocessed. A further advantage is that during projection operations, the footage indicator serves to teach the operator how long the film has been projected, or how long the projection of that portion of the film which remains unprojected takes.

Figure 4:
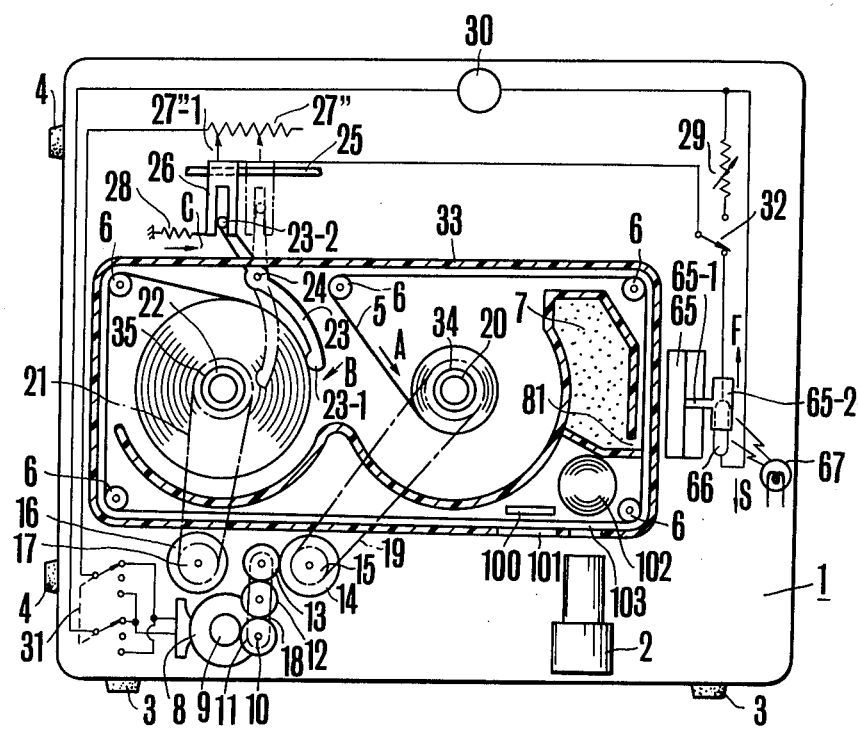
FIG. 4 is a schematic side elevational view, partially in section, illustrating another form of the embodiment shown in FIG. 3.

In FIG. 4, another form of the second motor control device is illustrated. The device comprising a lever 23 which is fulcrumed at a pivot pin 24, of which one arm has a projection 23-1 formed on the end portion thereof for sliding engagement with the peripheral surface of the film strip coil around the take-up reel 22, and of which the other arm has a pin 23-2 mounted on the end portion thereof for engagement in a yoke 26 mounted on a slider 27"-1 of a variable resistor 27". The yoke 26 is slidably mounted on a guide rail 25 and is biased by an expansion spring 28 in the direction indicated by arrow C to urge the projection 23-1 for normal engagement with the peripheral surface of the film strip coil around the take-up reel 22. As the film strip is transported from the take-up reel 22 to the supply reel 20, the diameter of the film strip coil on the take-up reel 22 is decreased, so that the lever 23 is turned by the force of the expansion spring 28 in the clockwise direction to displace the yoke 26 in the right-hand direction as viewed in the FIG. 4 from the position indicated by the solid lines and occurring at the initiation of the processing operation to the position indicated by the two-dot-dash lines and occurring at the termination of the processing operation, thereby the resistance of the variable resistor 27" is increased with decrease in the corresponding speed of motor 8. In effect, the rate of travel of the film strip 5 across the processing station is held constant during the entire operation of the applicator 7 even though the film strip is being coiled in turns of ever increasing diameters on the supply reel 20.

In a processor-projector unit employing the processing system of the present invention, some of the heat generated in the illumination system for producing projection light can be utilized to dry the coating of processing fluid applied on the film strip for the purpose of preventing the adjacent turns of the film strip coiled on the supply reel from sticking together. During the processing operation of the film strip, it is returned from the take-up reel to the supply reel at a rate of speed greater than normally associated with exposure and projection operations. At this relatively fast rate of speed, the processing fluid applied to the film strip as it passes through the processing station is not thoroughly dried before the film strip is coiled on the supply reel. With the processor-projector unit including the device for utilizing the generated heat, therefore, it is possible to perform the projection operations as soon as the entire length of the film strip has been processed.

Figure 5:
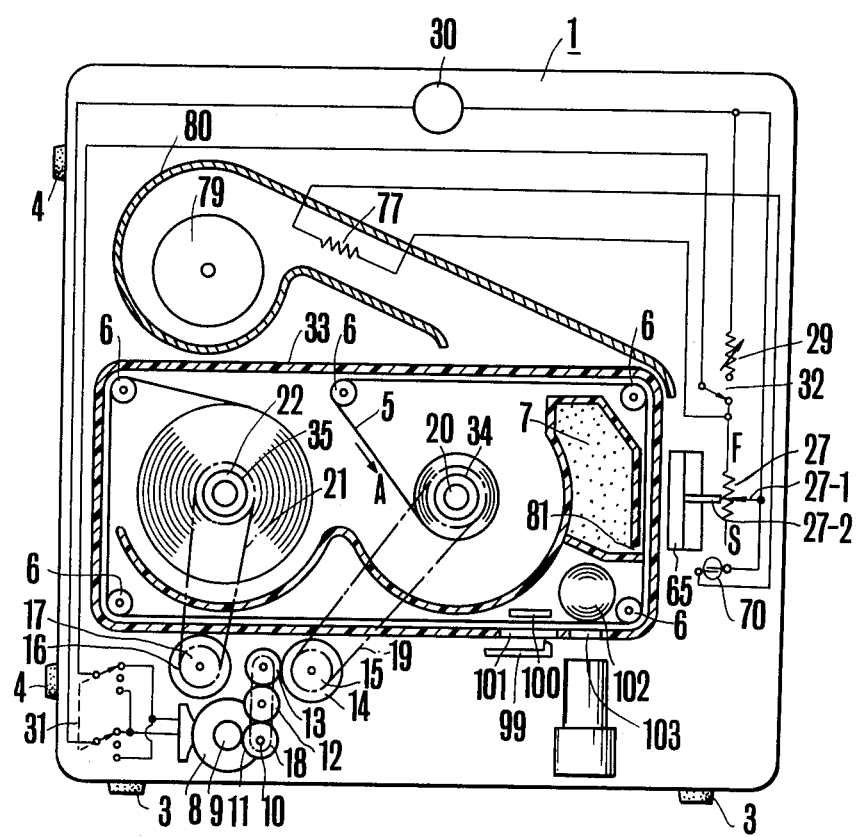
FIGS. 5 and 6 are schematic side elevational views, partially in section, illustrating two different forms of still another embodiment of the present invention employed in the projector shown in FIG. 1.

In some cases where the ambient temperature of the processing station is too low to effect the desired processing of the film strip by controlling the rate of travel of the film strip, it is preferred that the processor-projector unit is provided with air conditioning means incorporated therein. In the preferred embodiment shown in FIG. 5, the air conditioning means is constructed as comprising normally energized air blowing means 79, a heat generating means 77 mounted in the housing of the air blowing means 79, and a thermostat 70 connected in series with the heat generating means. The operation of the thermostat positioned adjacent the processing station externally of the cartridge 33 is such that when the ambient temperature of the cartridge is decreased from the lower limit, for example 10° C, of the optimum processing temperature range, the thermostat 70 is made conductive to close the heater circuit. Then, a blow of heated air producing in the housing 80 of the air blowing means 79 is allowed to surround the cartridge to increase the temperature of processing fluid in the applicator 7. When the temperature of the processing fluid exceeded the lower limit of the optimum range, the thermostat 70 is turned off. After that, the rate of travel of the film strip across the processing station is controlled in accordance with the temperature detected by the thermometer 65 in a manner similar to that described in connection with FIG. 1.

Figure 6:
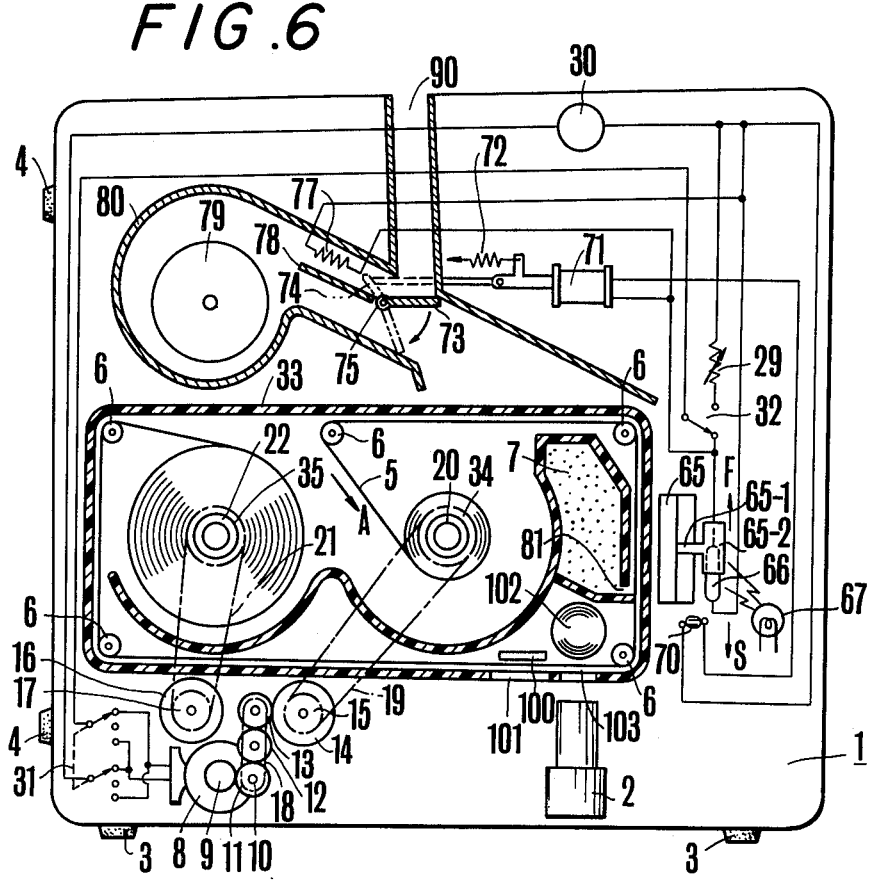

In the preferred embodiment of the present invention shown in FIG. 6, the air conditioning means is constructed as including a solenoid 71 having plunger connected in series with the thermostat 70 and normally biased in the left-hand direction as viewed in FIG. 6, a door 73 hinged at a pin 75 and positioned in the housing 80 upon turning movement to convert the direction of blow of heated air, a link 74 mounted on the door 73 upon engagement with the plunger to turn the door 73. In operation of the air conditioning means shown in FIG. 6, when the ambient temperature is decreased from the lower limit of the optimum processing temperature range, the thermostat 70 is turned on to energize the solenoid 71 having the plunger 71 to attract the link 74 against the force of a spring 72, thereby the door 73 is turned in a clockwise direction to the position indicated by the two-dot-dash lines. In this arrangement, the air heated by the normally energized heater 77 is allowed to surround the cartridge 33 to increase the temperature of the processing fluid in the applicator. As the ambient temperature of the processing station increases and exceeds the lower limit of the optimum range, the thermostat is turned off to deenergize the solenoid 71, thereby the door is turned in a counterclockwise direction to direct the heated air to the duct 90.

Figure 7:
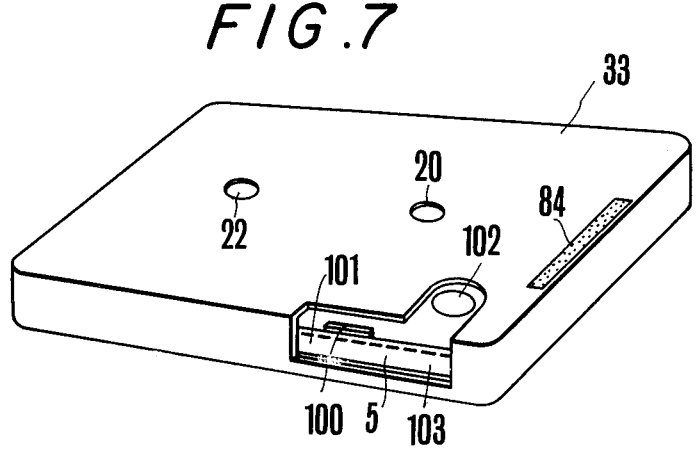
FIG. 7 is a perspective view of a motion picture film handling cartridge adapted for use in the processing system of the invention and embodying one form of the invention.
Figure 8:
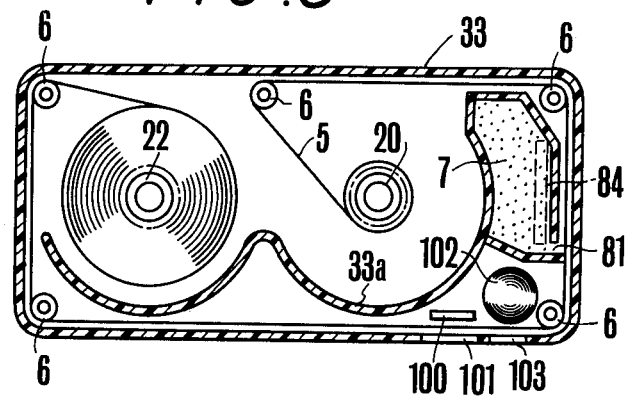
FIG. 8 is a schematic sectional view of the cartridge shown in FIG. 7.

According to further preferred embodiment of the present invention, the film handling cartridge which can be utilized in the processing system of the invention to facilitate film exposing, processing and projection operations is provided with a reversal thermo-paint strip 84 applied on a portion of the external surface of the cartridge 33 as shown in FIG. 7 to insure that an optimum processing of the film strip is facilitated without failure. It is preferred to position the thermo-paint strip 84 on a place shown in phantom in the FIG. 8. The thermo-paint has such a property that when the temperature of the cartridge is in an optimum processing temperature range, the thermo-paint exhibits a color, for example, blue, white when it is outside the range, the thermo-paint exhibits a different color other than blue.

Figure 9:
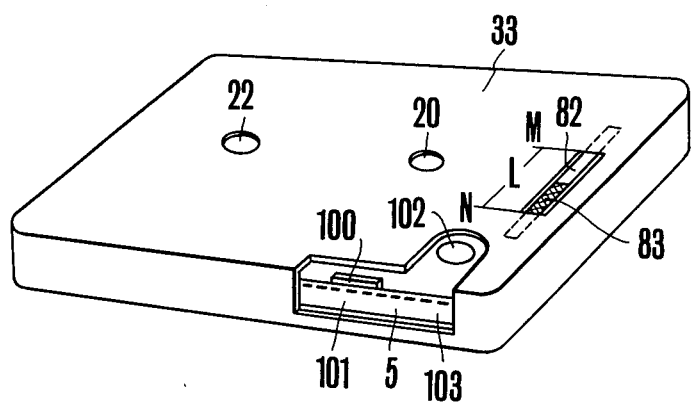
FIG. 9 is a perspective view of the cartridge shown in FIG. 7 with a modification.

In FIG. 9, a thermometer 82 is mounted in a recessed portion formed on the housing of the cartridge 33 and provided with a temperature indicator 83 visible from the outside of the cartridge housing. So long as the indicator stays at a position between the lower limit, M, (about 10° C) and the higher limit, N, (35° C) of an optimum processing temperature range, L, it may be recognized that an optimum processing of the film strip will be effected with the cartridge 33. If the indicator 83 is outside of the optimum range, L, the operator may previously take a necessary procedure such as heating or cooling treatment for facilitating a better processing of the film strip.

It will be seen from the foregoing description that the present invention contemplates the use of temperature detecting means, temperature control means and motor control devices for controlling processing conditions when an exposed strip of motion picture film is processed with a multipurpose film handling cartridge mounted on a motion picture camera or projector. Whilst the invention has been described above in connection with applications in a motion picture camera and projector, it will be appreciated that the aforesaid motor control devices associated with temperature detecting means and the elements of the devices find useful applications in other types of cameras and projectors differing from the types described above as well as in specially designed processors. Since various modifications and structural changes may be made without departing from the spirit of the present invention, the invention is not intended to be limited to the details shown.

What is claimed is:

1. In a processing system utilizing a film cartridge, said cartridge containing a film and having a processing station and means adapted to advance said film across the processing station, which system comprises drive means including a motor mounted external to said cartridge and operatively connected to said film advance means when said cartridge is loaded in said system, the improvement comprising:

means for generating warm wind;

guide means for directing said warm wind toward said processing station, said guide means being able to be changed over between a first state where a wind path for directing the wind toward said processing station is formed and a second state where said wind path is closed; and means for controlling the change-over of said guide means and wherein said controlling means comprises:

a thermostatic switch capable of detecting ambient temperature of said processing station; and a plunger which actuates said guide means under control of said switch, said plunger being electrically connected with said switch and operatively connected with said guide means, said thermostatic switch for controlling said plunger for setting said guide means to the first state when said ambient temperature drops below an optimum processing temperature range.

2. The improvement according to claim 1 further comprising:

temperature detecting means for detecting said ambient temperature of said processing station; and motor control means for controlling the speed of said motor in accordance with the temperature detected by said temperature detecting means to effect optimum processing of said film by establishing a predetermined relationship between the processing temperature and the rate of travel of said film advanced by said film advance means across said processing station, said motor control means being electrically connected with said motor and operatively associated with said temperature detecting means.

3. The improvement according to claim 2, wherein said motor control means includes power control means for controlling the power for said motor, said power control means being operatively associated with said temperature detecting means.

4. The improvement according to claim 3, wherein said power control means includes a variable resistor electrically connected to said motor and operatively associated with said temperature detecting means to vary the resistance in accordance with the detected temperature.

5. A film-handling apparatus adapted to be loaded with a film cartridge containing a roll of motion picture film and a processing station and for applying a coating of processing fluid thereto when said film is in an exposed condition, said station including means for storing and processing fluid, said apparatus comprising:
 a housing for receiving said film cartridge;
 means for transporting said exposed film from an initial position within said cartridge to said processing station; and
 a temperature control device for regulating the processing temperature in accordance with a predetermined proper processing temperature range for supplying a uniform coating of the processing fluid to said film, said device including:
 means for blowing wind toward said processing station;
 means for defining a path for the wind blown from the wind blowing means, said defining means defining a first wind path and a second wind path separately;
 means for heating the wind passing through the first wind path; and
 means for changing over the wind path between said first wind path and said second wind path, said changing over means able to detect the ambient temperature of said processing station and change over the wind path to the first wind path from the second wind path when said ambient temperature drops below said proper temperature range, and further change over the wind path to the second wind path from the first wind path when said ambient temperature rises above said proper range.

6. A film-handling system for containing a strip of film, for applying a coating of processing fluid thereto, and for enabling the projection of visible images formed thereon, comprising:
 a film cartridge comprising a housing which is adapted to be loaded in the system for film processing and projection operations;
 a processing station within said housing;
 a projection station within said housing;
 an exposed strip of film convoluted at an initial position within said housing;
 drive means for transporting the film said drive means having a first state wherein said exposed strip of film may be transported from the initial position through the processing station to apply a coating of said processing fluid to said exposed strip of film and a second state wherein the processed strip of film may be transported in a direction opposite to the first state back to the initial position for projection of processed images in the strip of film; and
 a temperature control device for regulating the processing temperature according to a predetermined proper processing temperature range for supplying a uniform coating of the processing fluid to said exposed film, said device including:
 a wind blower which blows wind toward said processing station;
 means for defining a path for the wind blown from said wind blower, said means defining a first wind path and a second wind path separately;
 a heater which heats the wind passing through the first wind path and is positioned in the first wind path;
 means for cutting off the wind path, which is able to be changed over between a first state where the second path is cut off and a second state where the first path is cut off; and
 a thermostatic switch able to detect the ambient temperature of said processing station, said switch being operatively connected with said wind path cutting off means for changing it over from its second state to its first state when said ambient temperature drops below said proper processing temperature range, and changing over said wind path cutting off means from its first state to its second state when said ambient temperature rises above said proper range.

* * * * *